United States Patent [19]
Bruneau et al.

[11] Patent Number: 5,820,930
[45] Date of Patent: Oct. 13, 1998

[54] ADHESIVE COMPOSITION FOR (METH) ACRYLIC (CO)POLYMER MATERIALS

[75] Inventors: Jean-Michel Bruneau, Gisors; Philippe Heim, Pau; Jacques Magne, Gisors, all of France

[73] Assignee: Atohaas Holding C.V., Netherlands

[21] Appl. No.: 790,830

[22] Filed: Jan. 30, 1997

[30] Foreign Application Priority Data

Jan. 31, 1996 [FR] France ................................ 96 01119

[51] Int. Cl.$^6$ .............................. B05D 5/10; C08L 73/00
[52] U.S. Cl. .................... 427/207.1; 525/186; 525/190; 525/329.7; 525/385; 428/500
[58] Field of Search .................... 525/186, 190, 525/329.7, 385; 427/207.1; 428/500

[56] References Cited

U.S. PATENT DOCUMENTS

| | | | |
|---|---|---|---|
| 4,224,097 | 9/1980 | Tlasma et al. | 156/307.3 |
| 4,340,440 | 7/1982 | Chute | 156/330.9 |
| 5,198,556 | 3/1993 | Hung et al. | 549/448 |
| 5,290,831 | 3/1994 | Di Ruocco et al. | 524/533 |
| 5,360,462 | 11/1994 | Harmer et al. | 51/295 |

FOREIGN PATENT DOCUMENTS

| | | |
|---|---|---|
| 304779 | 3/1989 | European Pat. Off. . |
| 3827561 | 12/1989 | Germany . |
| 55-027053 | 2/1980 | Japan . |
| 4-209646 | 7/1992 | Japan . |
| 8-059817 | 8/1994 | Japan . |

*Primary Examiner*—Randy Gulakowski
*Attorney, Agent, or Firm*—Millen, White, Zelano & Branigan, P.C.

[57] ABSTRACT

The invention relates to an adhesive composition for plastics based on (meth)acrylic (co)polymer derived from 80 to 100% by weight of methyl methacrylate and from 0 to 20% by weight of at least one monomer containing ethylenic unsaturation which can be copolymerized with the methyl methacrylate. The adhesive composition comprises 1,3-dioxolane combined with formic acid or a mono-, di- or tetraglyme, dissolved (meth)acrylic (co)polymer, and optionally diluent additives. The invention further relates to articles made of (meth)acrylic (co)polymer obtained by casting, extrusion or injection and comprising a bonding joint formed from the said adhesive composition.

11 Claims, No Drawings

ADHESIVE COMPOSITION FOR (METH) ACRYLIC (CO)POLYMER MATERIALS

FIELD OF THE INVENTION

The invention relates to an adhesive composition for synthetic materials based on (meth)acrylic (co)polymer derived from 80 to 100% by weight of methyl methacrylate (MAM) and from 0 to 20% by weight of at least one monomer containing ethylenic unsaturation which can be copolymerized with the methyl methacrylate.

BACKGROUND OF THE INVENTION (Meth)acrylic polymers, in particular polymethyl methacrylate and copolymers of methyl methacrylate and of at least one monomer containing ethylenic unsaturation in an amount generally of less than 20% by weight, have properties which make them particularly usable industrially. Thus, besides their thermoplasticity, their high mechanical strength, their excellent behaviour towards ageing, towards corrosion and towards atmospheric agents, they have exceptional optical properties (transmission of light, clearness, brilliance).

These polymer materials may be used to manufacture articles. These articles, in the form of plates obtained by casting or extrusion, or shaped by extrusion or injection, may be cut up, polished, adhesively bonded, welded or folded.

In order to manufacture articles made of (meth)acrylic polymers, it is necessary to have adhesives adapted to these products.

It is known to use, as adhesive, volatile organic solvents for the polymer such as chlorinated solvents, which have the property of swelling or of dissolving the surface of the polymers to be adhesively bonded; after evaporation of the solvent, the adhesive bonding is ensured by the material itself of the polymer to be adhesively bonded.

Solvent adhesives have also been used, these being mixtures of solvents for the polymer and of a larger or smaller amount of the dissolved (meth)acrylic polymer. The presence of the dissolved polymer makes it possible to delay evaporation of the solvent and, thus, to be able better to adjust the components to be adhesively bonded. After evaporation of the solvent, it is the polymer derived from the adhesive which ensures the adhesive bonding.

However, the evaporation of the solvent creates absences of material which result in the formation of bubbles or tensions which are detrimental to the good mechanical strength or the aesthetic appearance of the final object or article.

The adhesive bonds must be of high quality and remain practically invisible so as to conserve the good appearance of the final object and, in addition, they must have a resistance to traction which is sufficient for the object to be able to withstand mechanical stresses.

In the case of polymethyl methacrylate, the resistance to traction is about 75 MPa. In order to be satisfactory, the bonding joint must have a resistance to traction of at least about 30 MPa.

In order to obtain satisfactory adhesive bonding, the solvent of the adhesive composition must thus be able to soak into and dissolve (or swell) the surface of the polymer material sufficiently to impart good characteristics of breaking strength to the bonding joint. However, the action of the solvent should not bring about defects in the components, such as cracks. In addition, the solvent should evaporate quickly so that the adhesively bonded component can be handled by the user as soon as possible, but not too quickly, in order to make it possible, as has already been mentioned, to correctly adjust the components to be adhesively bonded. The bonding joint itself must be clear and have no visible defects, such as bubbles originating from removal of the adhesive caused by drying.

The solvents generally used are chlorinated solvents, such as dichloroethane and dichloromethane. They give excellent results, but have the drawback of being toxic.

The subject of the invention is thus an adhesive composition for (meth)acrylic (co)polymers (A) derived from 80 to 100% by weight of methyl methacrylate and from 0 to 20% by weight of at least one monomer containing ethylenic unsaturation which can be copolymerized with the methyl methacrylate, which composition contains no toxic solvents and satisfies the requirements mentioned above, so as to obtain desired bonding joints.

SUMMARY OF THE INVENTION

The adhesive composition according to the invention comprises, by weight, 45 to 90% of 1,3-dioxolane, from 2 to 25% of formic acid or of mono-, di- or tetraglyme, from 2 to 30% of dissolved (meth)acrylic (co)polymer (B) and from 0 to 40% of organic diluent additives which are or are not solvents for the polymer material to be adhesively bonded.

The adhesive composition preferably comprises, by weight, from 60 to 85% of 1,3-dioxolane, 3 to 20% of formic acid or of mono-, di- or tetraglyme, 10 to 16% of dissolved (meth)acrylic (co)polymer (B) and 10 to 40% of diluent additives.

The role of the 1,3-dioxolane compound is to soak into the surfaces of the methacrylic (co)polymer articles to be bonded in order to allow good adhesion of the bonding joint. It also serves, during preparation of the adhesive, to dissolve the (meth)acrylic (co)polymer (B) added.

The formic acid and the mono-, di- or tetraglyme act as evaporation retardant for the 1,3-dioxolane and increase the adhesion of the bonded joint.

As mentioned above, the addition of (meth)acrylic (co)polymer (B), generally in the form of pearls or granules, of weight-average molecular mass less than 1,000,000 and preferably of between 50,000 and 1,000,000 and, in particular, between 500,000 and 700,000, makes it possible to delay the evaporation of the solvent and, thus, better to control the assembly of the components and the application of the adhesive. It also serves, as a polymer, to make up for the shortages of material in the article to be bonded. These (meth)acrylic (co)polymers are generally formed from methyl methacrylate homopolymers or from copolymers of methyl methacrylate and of alkyl acrylate in which the alkyl group has from 1 to 10 carbon atoms. These copolymers generally contain less than 20% by weight of alkyl acrylate.

The additives which may be mentioned are diluent additives which are or are not solvents for the polymer to be adhesively bonded, such as ketones, ethers, alcohols or esters, such as methyl ethyl ketone, methyl isobutyl ketone, acetone, diacetone alcohol, dimethoxymethane, methyl acetate, ethyl acetate, butyl acetate, isobutyl acetate, methyl phthalate, ethyl formate and butanol.

The function of these additives is to promote the dissolution, to delay the evaporation in order to obtain a smooth and uniform bonding joint. They may also prevent the formation of a surface film which would interfere with the evaporation of the solvents.

The amount of (meth)acrylic (co)polymer (B) dissolved in the adhesive composition depends on the final use of this composition. For certain applications, the adhesive composition must be able to be introduced by capillary action into the space which is to form the joint. It must be sufficiently fluid in order to correctly wet the surface to be adhesively bonded, but must be fairly viscous, in order to delay the evaporation of the solvents which must soak into and dissolve or swell the material to be adhesively bonded so as to ensure appropriate adhesive bonding and thus good resistance to traction of the final bonding joint. The viscosity of the adhesive composition is generally between 0.1 and 5 Pa·s.

The (meth)acrylic polymers (A) which may be adhesively bonded with the composition according to the invention comprise, in particular, methyl methacrylate homopolymer and copolymers of methyl methacrylate and of at least one monomer containing ethylenic unsaturation which is copolymerizable with methyl methacrylate in an amount generally of less than 20% by weight. Monomers containing ethylenic unsaturation which may be mentioned are alkyl acrylates in which the alkyl group has from 1 to 10 carbon atoms, such as methyl acrylate, ethyl acrylate, n-butyl acrylate, 2-ethylhexyl acrylate and isobutyl acrylate, styrene, substituted styrenes such as a-methylstyrene, acrylonitrile, methacrylonitrile, $C_2$-$C_8$ alkyl methacrylates, lower hydroxyalkyl ($C_1$ to $C_5$) acrylates and methacrylates, lower alkoxy acrylates, acrylamide, acrylic acid, methacrylic acid and maleimides.

The (meth)acrylic (co)polymer materials to be adhesively bonded may be obtained by casting, extrusion or injection, in a manner which is known per se.

The examples which follow, given by way of example, serve to illustrate the invention.

The adhesive bondings are evaluated by traction on test pieces consisting of two parts made of (meth)acrylic polymer bonded end to end. The resistance to traction of the bonding joint is measured according to ISO standard 527.

EXAMPLE 1

In order to assemble two cast polymethyl methacrylate plates of format 100×300×5 mm via their long side, a bonding joint about 5/10 mm in thickness is applied between the two faces to be adhesively bonded. The adhesive consists, by weight, of 80% of 1,3-dioxolane, 9% of formic acid and 11% of dissolved polymethyl methacrylate ($\overline{Mw}$=500,000). The assembly can be handled after about 10 minutes. After leaving aside for 10 days, it is cut up into 8×15×5 mm samples according to ISO standard 527. The resistance to traction is 34 MPa.

EXAMPLE 2

The same test as in Example 1 is carried out with an adhesive solution containing, by weight, 63.5% of 1,3-dioxolane, 4.5% of formic acid, 20% of methyl acetate and 12% of dissolved polymethyl methacrylate ($\overline{Mw}$=500,000). The resistance to traction is 38 MPa.

EXAMPLE 3

The same test as in Example 1 is carried out with an adhesive composition containing, by weight, 69% of 1,3-dioxolane, 20% of diglyme and 11% of polymethyl methacrylate ($\overline{Mw}$=500,000). The resistance to traction is 35 MPa.

In the three cases, the bonding joint appears clear, free of bubbles and perfectly smooth.

EXAMPLE 4

Comparison

By way of comparison, two plates of cast polymethyl methacrylate are bonded together as in Example 1, but a bonding composition comprising, by weight, 89% of 1,3-dioxolane and 11% of dissolved polymethyl methacrylate (($\overline{Mw}$=500,000) is used. The traction strength is 22 MPa. A polymer film forms at the surface of the bonding joint, which slows down the drying. Shrinkage of the edge is observed around the joint.

EXAMPLE 5

Comparison

The process is performed as in Example 1, but a bonding composition comprising, by weight, 91% of 1,3-dioxolane and 9% of formic acid is used. The traction strength is 20 MPa. Shrinkage is observed at various places in the bond.

EXAMPLE 6

Comparison

The process is performed as in Example 1, but a bonding composition comprising only 1,3-dioxolane is used. The traction strength is 15 MPa. Their appearance is not good (shrinkage in several places).

Wherein the primary focus of the invention is directed to the bonding of a (co)polymer of methyl methacrylate, it is contemplated that the adhesive composition will also be suitable for bonding other materials, e.g., solid articles of (co)polymers of other methacrylates and acrylates, e.g., a homopolymer of ethyl methacrylate.

Thus, the preceding examples can be repeated with similar success by substituting the generically or specifically described reactants and/or operating conditions of this invention for those used in the preceding examples.

For the purpose of clarity, it is to be noted that the expression "resistance to traction" used heretofore may also be called "tensile strength". The expression "glyme" is a common abbreviation for glycol ethers; for example, "monoglyme" is glycol dimethyl ether and "tetraglyme" is dimethoxytetraglycol. The abbreviation "IPO", stands for International Standards Organization and the ISO standards mentioned in the examples are incorporated by reference herein. Likewise, incorporated is the French priority document pertaining to the invention, namely French No. 96.01119 filed Jan. 31, 1996.

From the foregoing description, one skilled in the art can easily ascertain the essential characteristics of the invention, and without departing from the spirit and scope thereof, can make various changes and modifications of the invention to adapt it to various usages and conditions.

We claim:

1. An adhesive composition comprising, by weight, from 45 to 90% of 1,3-dioxolane, from 2 to 25% of formic acid or of mono-, di- or tetraglyme, from 2 to 30% of dissolved (meth)acrylic (co)polymer (B) and from 0 to 40% or organic diluent additives, said dissolved (meth)acrylic (co)polymer (B) being polymethyl methacrylate or a copolymer of methyl methacrylate and of at least one alkyl acrylate monomer in which the alkyl group has from 1 to 10 carbon atoms.

2. A composition according to claim 1, comprising, by weight, 60 to 85% of 1,3-dioxolane, 3 to 20% of formic acid or of mono-, di- or tetraglyme, 10 to 16% of dissolved (meth)acrylic (co)polymer (B) and 10 to 40% of at least one organic diluent additive.

3. A composition according to claim 2, wherein the diluent additive is a ketone, an ether, an alcohol or an ester.

4. A composition in accordance with claim 3, wherein the diluent additive is methyl ethyl ketone, methyl isobutyl ketone, acetone, diacetone alcohol, dimethoxymethane, methyl acetate, ethyl acetate, butyl acetate, isobutyl acetate, methyl phthalate, ethyl formate or butanol.

5. A composition in accordance with claim 1 wherein the dissolved (co)polymer (B) is polymethyl methacrylate or a (co)polymer of methyl methacrylate and of at least one alkyl acrylate monomer in which the alkyl group has from 1 to 10 carbon atoms, of weight-average molecular mass less than 1,000,000.

6. A composition in accordance with claim 1 having a viscosity of between 0.1 and 5 Pa.s.

7. An article comprising a solid shape of a (meth)acrylic (co)polymer having been obtained by polymerizing 80 to 100% by weight of methyl methacrylate monomer and from 0 to 20% by weight of at least one monomer containing ethylenic unsaturation which is copolymerizable with the methyl methacrylate, and a bonding joint adhering to said solid shape, said bonding point having been obtained from a composition according to claim 1.

8. An article according to claim 7, wherein the solid shape of (meth)acrylic (co)polymer material has been obtained by casting, by extrusion or by injection.

9. A composition according to claim 5 wherein the weight average molecular weight is 500,000–1,000,000.

10. A composition according to claim 5 wherein the weight average molecular weight is 500,000–700,000.

11. A process of producing an article comprising applying a composition according to claim 1 to a solid shape of a (co)polymer which was obtained by polymerizing 80–100% by weight of methyl methacrylate and from 0 to 20% of at least one monomer containing ethylenic unsaturation which is copolymerizable with the methyl methacrylate.

* * * * *